Jan. 27, 1953  J. S. WICK  2,626,499
LAWN EDGER
Filed April 2, 1951
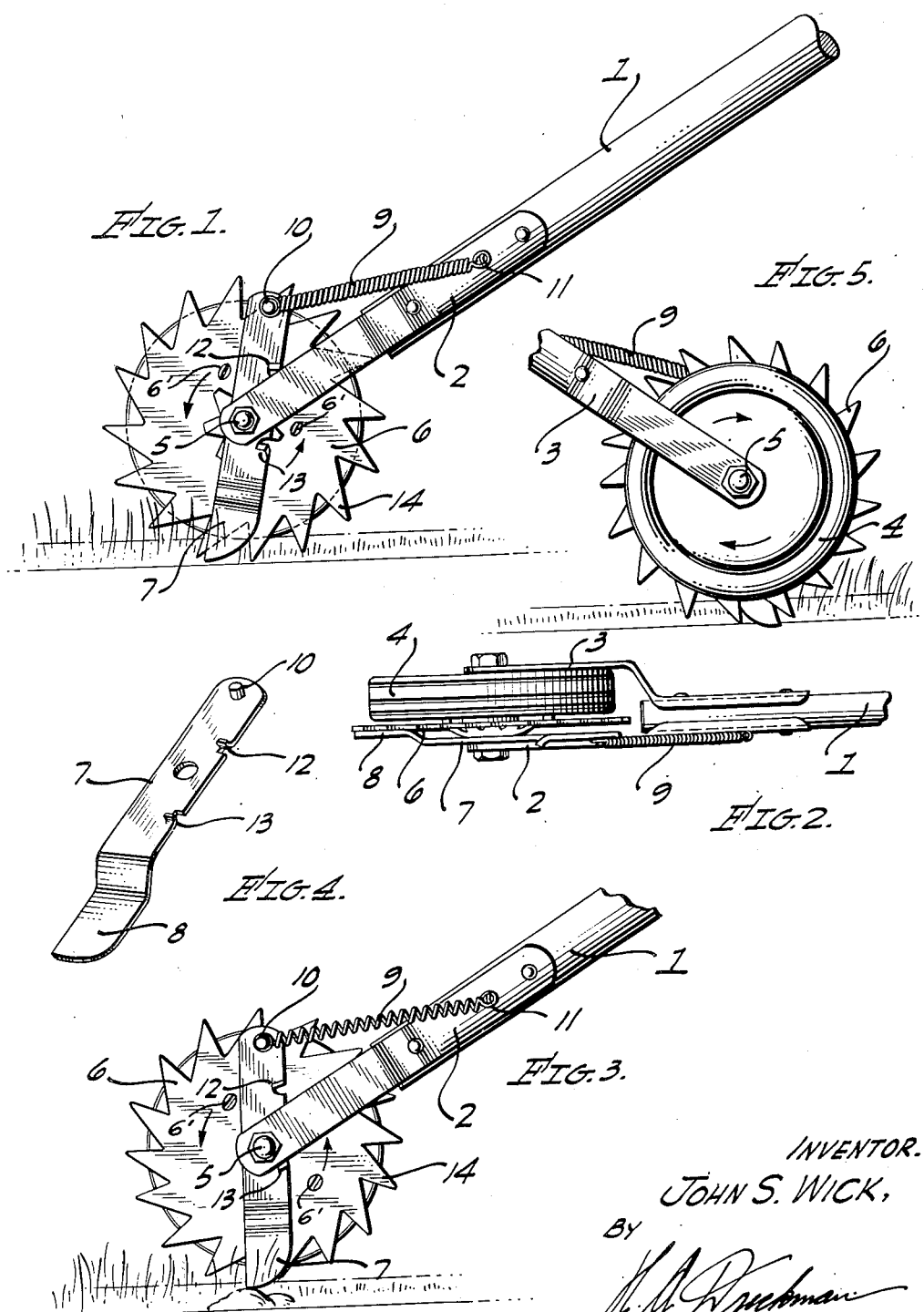
INVENTOR.
JOHN S. WICK,
BY
ATTORNEY.

Patented Jan. 27, 1953

2,626,499

UNITED STATES PATENT OFFICE 2,626,499

LAWN EDGER

John S. Wick, Long Beach, Calif.

Application April 2, 1951, Serial No. 218,749

2 Claims. (Cl. 56—256)

This invention relates to a lawn edger of the type in which a toothed wheel operates in conjunction with a blade for the purpose of cutting the grass at the edge of a lawn.

This invention is a continuation-in-part of my application filed April 11, 1950, Serial Number 155,371, entitled: Lawn Edgers, now abandoned.

An object of my invention is to provide a novel lawn edger in which the blade cooperating with the toothed wheel or disk is spring pressed in one direction so that this blade will have a limited rotary movement relative to the toothed wheel.

A feature of my invention is to provide a novel lawn edger in which the cutter blade is held in one position by means of a coil spring, and this blade can rotate relative to the toothed wheel, thus giving a scissor-like cutting effect between the toothed wheel and the blade.

Other objects, advantages and features of invention may appear from the accompanying drawing, the subjoined detailed description and the appended claims.

In the drawing:

Figure 1 is a side elevation of my lawn edger.

Figure 2 is a top plan view of the same.

Figure 3 is a side view of the edger showing the blade rotated with respect to the cutter wheel.

Figure 4 is an enlarged perspective view of the blade.

Figure 5 is a side elevation of my lawn edger as viewed from the side opposite that shown in Figure 1.

Referring more particularly to the drawing, the numeral 1 indicates a handle of suitable length and on the lower end of this handle I secure a pair of supporting arms 2 and 3, which are fixedly attached to the handle and which support the cutting units, as follows:

A wheel 4 is journalled on a shaft 5, which extends through the arms 2 and 3 and is fixedly attached to these arms. A toothed cutter disk 6 is fixedly secured to one face of the wheel 4 by means of appropriate screws 6'. A cutter blade 7 is mounted on the shaft 5 and this blade extends diametrically across the disk 6. Only the lower end of the blade 7, however, bears against the face of the disk 6, since the blade 7 is bent as shown at 8. A coil spring 9 is attached to the pin 10 on the blade 7 and to an appropriate lug 11 on the arm 2. A pair of stops 12—13 are struck up from the blade 7, the stop 12 serving to hold the blade 7 in its normal position when the spring 9 is under minimum tension.

Should the lower end of the blade 7 strike an obstruction of any kind while the lawn edger is being rolled along the edge of the lawn, the blade will tilt rearwardly until the stop 13 engages the arm 2, as shown in Figure 3. The spring 9 is now under additional tension and tends to return the blade 7 to the position shown in Figure 1.

In swinging the lower end of the blade 7 forwardly, a scissor-like cutting action occurs between the blade 7 and the teeth 14 of the disk 6, and grass, roots, small twigs, and the like, will all cause the blade 7 to swing on the shaft 5 and, consequently, an almost continuous scissor-like cutting action is occurring between the rotating disk 6 and the blade 7.

I prefer that the teeth 14 of the disk 6 shall be shaped with one long tapered edge somewhat like the teeth of a saw so that a more effective cutting action is provided between the blade 7 and these teeth.

Having described my invention, I claim:

1. A lawn edger comprising a handle, a pair of arms on one end of said handle, a disk rotatably mounted in said arms, a blade extending diametrically across said disk, means pivotally mounting said blade, one end of said blade bearing against one face of the disk, and spring means attached to one end of said blade and pulling said blade in one direction.

2. A lawn edger comprising a handle, a pair of arms mounted on one end of said handle, a wheel journalled between said arms, a toothed disk attached to one face of the wheel, a blade extending diametrically across said disk and journalled between said arms, a stop lug on the blade engaging one of said arms to limit rotational movement of the blade, and a coil spring extending from said blade to one of said arms.

JOHN S. WICK.

REFERENCES CITED

The following references are of record in the file of this patent:

UNITED STATES PATENTS

| Number | Name | Date |
|---|---|---|
| 2,212,057 | Waller | Aug. 20, 1940 |

FOREIGN PATENTS

| Number | Country | Date |
|---|---|---|
| 23,617 | Australia | Apr. 2, 1930 |